(12) United States Patent
Flaig

(10) Patent No.: US 8,087,863 B2
(45) Date of Patent: Jan. 3, 2012

(54) SCREW NUT, METHOD OF PRODUCTION THEREOF AND CORRESPONDING TOOL

(76) Inventor: Hartmut Flaig, Aldingen (DE)

( * ) Notice: Subject to any disclaimer, the term of this patent is extended or adjusted under 35 U.S.C. 154(b) by 589 days.

(21) Appl. No.: 12/158,763

(22) PCT Filed: Dec. 21, 2006

(86) PCT No.: PCT/EP2006/012418
§ 371 (c)(1),
(2), (4) Date: Jun. 23, 2008

(87) PCT Pub. No.: WO2007/076968
PCT Pub. Date: Jul. 12, 2007

(65) Prior Publication Data
US 2009/0016848 A1 Jan. 15, 2009

(30) Foreign Application Priority Data

Dec. 22, 2005 (DE) .......................... 10 2005 062 045

(51) Int. Cl.
*F16B 39/28* (2006.01)

(52) U.S. Cl. .......................... 411/277; 411/285; 411/290

(58) Field of Classification Search .................. 411/277, 411/278, 285, 323, 360, 430, 501, 290, 294, 411/301, 308–311
See application file for complete search history.

(56) References Cited

U.S. PATENT DOCUMENTS

| | | | | | |
|---|---|---|---|---|---|
| 1,777,201 | A | * | 9/1930 | Haddick | 470/19 |
| 1,959,620 | A | * | 5/1934 | Eveno | 411/277 |
| 2,222,460 | A | * | 11/1940 | Crowley | 411/285 |
| 2,320,785 | A | * | 6/1943 | Luce | 411/285 |
| 2,336,023 | A | * | 12/1943 | Luce | 411/285 |
| 2,363,680 | A | * | 11/1944 | Luce | 411/285 |
| 2,376,927 | A | * | 5/1945 | Luce | 411/285 |
| 2,385,390 | A | | 9/1945 | Tripp | |
| 2,529,093 | A | * | 11/1950 | Luce | 411/285 |
| 2,551,102 | A | * | 5/1951 | Delaney | 411/277 |
| 2,592,129 | A | * | 4/1952 | Engstrom | 470/19 |
| 2,952,289 | A | | 9/1960 | Kreidel et al. | |
| 4,069,854 | A | * | 1/1978 | Heighberger | 411/277 |
| 4,993,902 | A | * | 2/1991 | Hellon | 411/430 |
| 5,702,217 | A | * | 12/1997 | Charbonnel et al. | 411/259 |
| 6,406,237 | B1 | * | 6/2002 | Wojciechowski et al. | 411/107 |

FOREIGN PATENT DOCUMENTS

| | | |
|---|---|---|
| CH | 249469 | 6/1947 |
| DE | 305761 | 11/1913 |
| DE | 490889 | 2/1930 |
| FR | 2557652 | 7/1985 |

* cited by examiner

*Primary Examiner* — Victor Batson
*Assistant Examiner* — Roberta Delisle
(74) *Attorney, Agent, or Firm* — Bachman & LaPointe, P.C.

(57) ABSTRACT

A screw nut from a metal material, which comprises a tapped hole and an inner groove which radially extends in relation to the longitudinal axis thereof. An annular collar is formed onto one of the faces of the screw nut and its cross-section is bent in the direction of the axis to such a degree as to delimit, together with a section of the face surrounding the tapped hole as a contact surface, a receiving slot that is directly associated therewith.

15 Claims, 3 Drawing Sheets

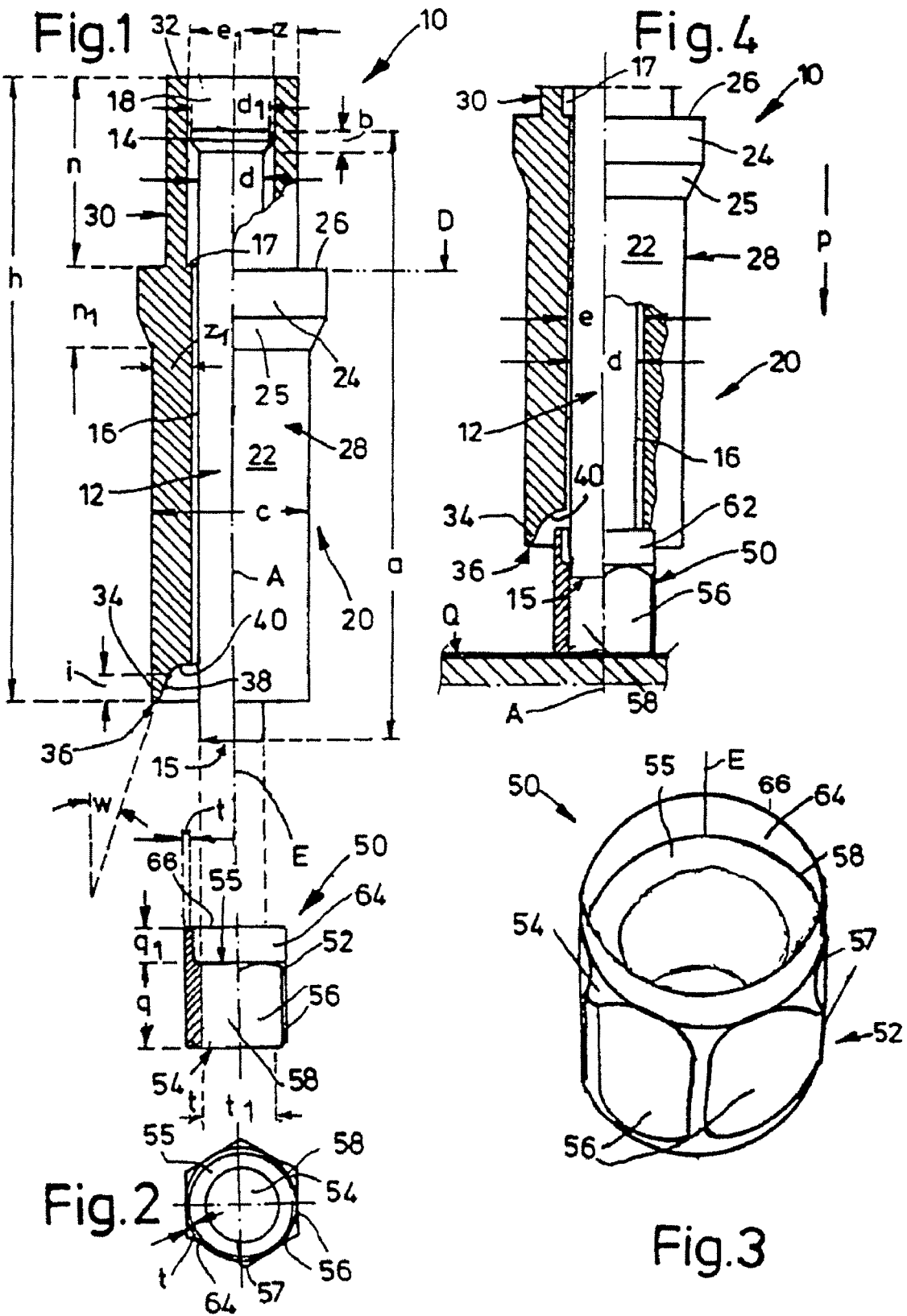

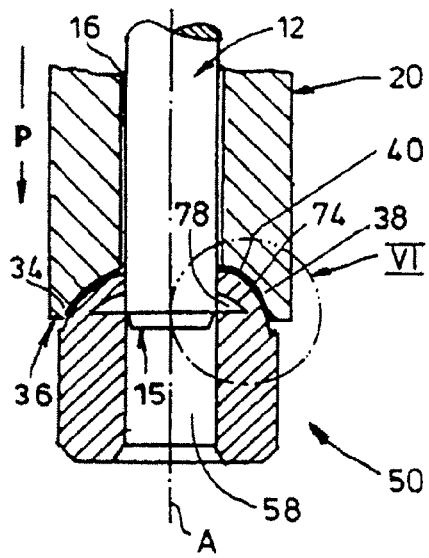
Fig.5
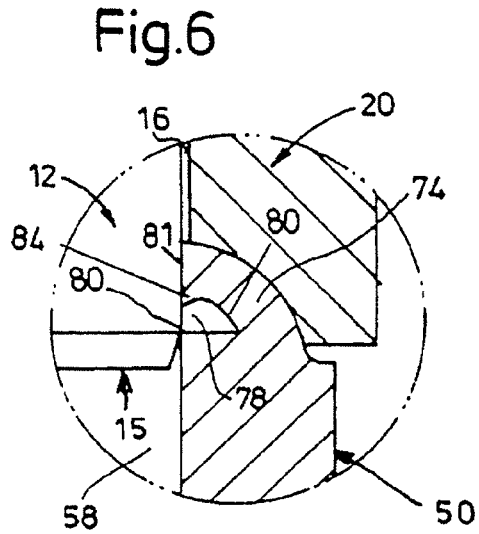
Fig.6
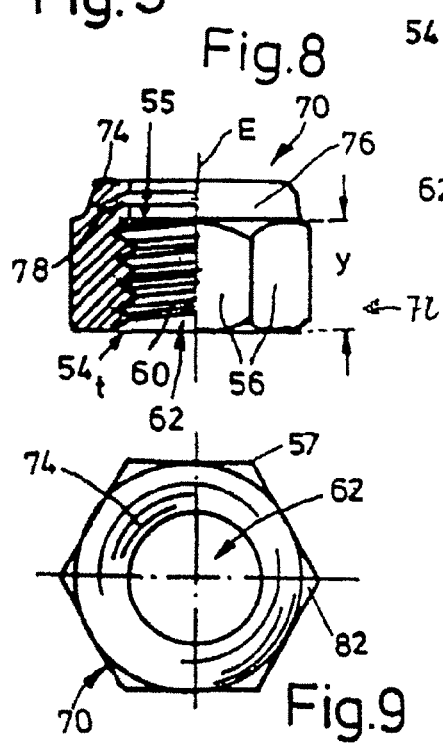
Fig.7
Fig.8
Fig.9
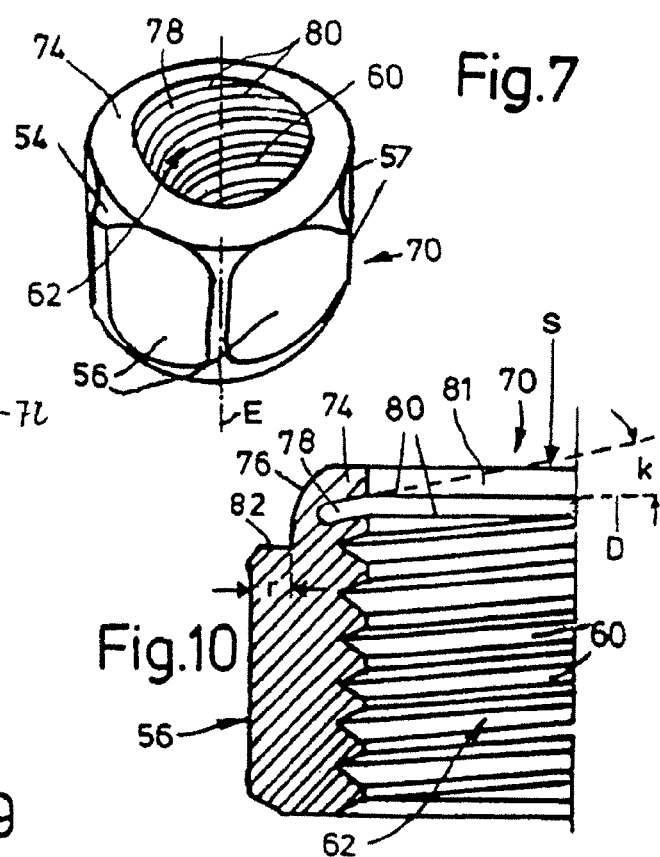
Fig.10

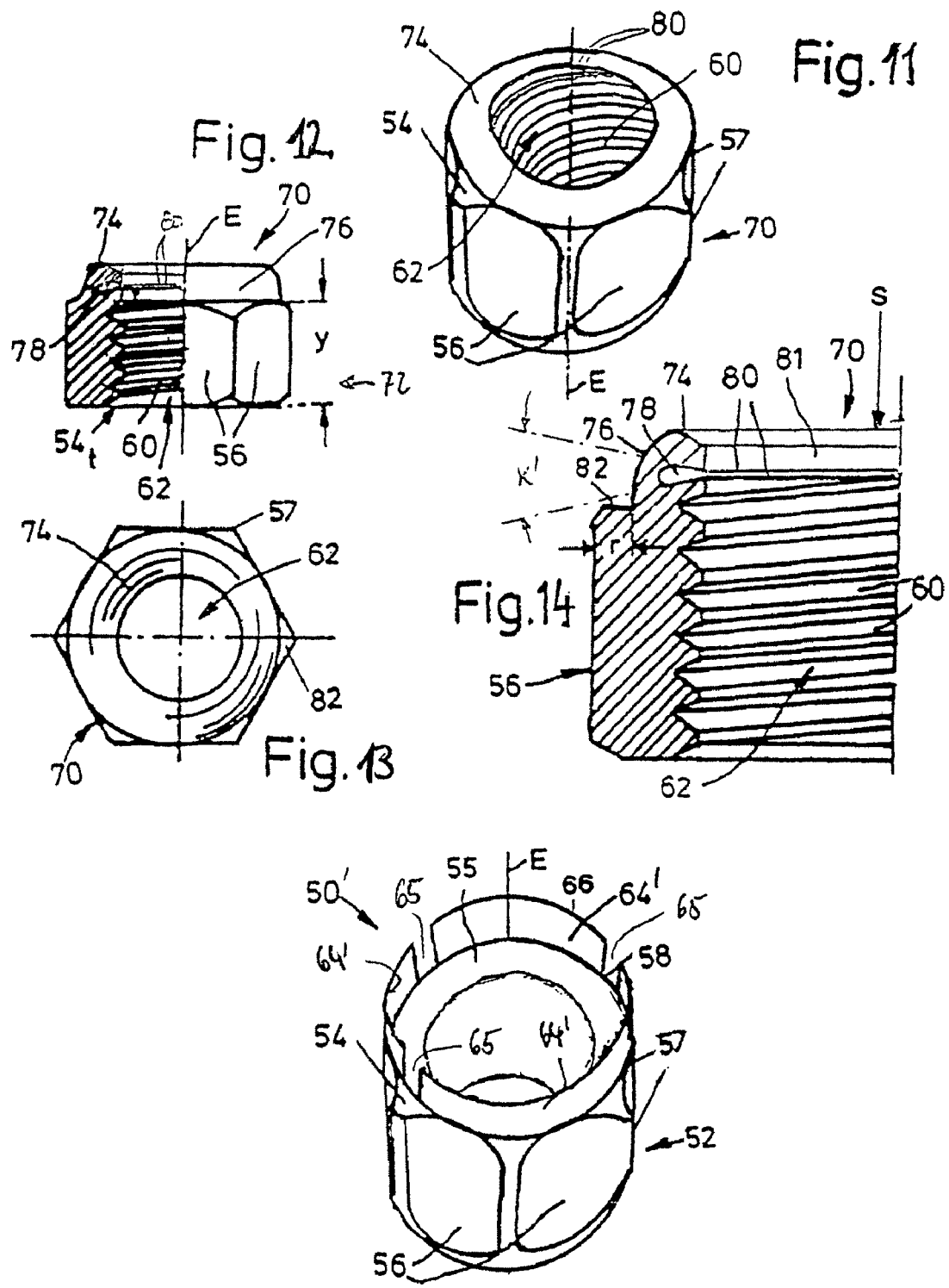

SCREW NUT, METHOD OF PRODUCTION THEREOF AND CORRESPONDING TOOL

BACKGROUND OF THE INVENTION

The invention relates to a screw nut comprising a metallic material with a threaded bore and an inner groove which is associated with the longitudinal axis of said threaded bore in radially circumferential fashion. In addition, the invention deals with a method for producing the screw nut and a tool developed therefor.

A nut and a method of the type mentioned at the outset are described in FR 2 557 652.

U.S. Pat. No. 2,363,680 describes a nut of another type, in which an annular collar is upset and a thread is provided on the inwardly pointing side face thereof. The upset part of the annular collar has a wall thickness which is larger than a wall thickness of the bent connecting part and of the adjacent part which has not been upset.

U.S. Pat. No. 2,952,289 discloses a nut, in which an annular collar is bent back and then axially compressed until it is positioned as close as possible to the free end of the nut.

U.S. Pat. No. 2,385,390 discloses a nut with an annular collar, which has cutouts.

A nut of another type is disclosed in the German patent 3 05 761, wherein the nut is provided with an annular hollow so as to form a safety nut, this process taking place by means of a drilling device on a machine tool with a revolving spindle, the spindle being aligned with a chuck for holding singular nuts or a plurality of nuts during the hollowing-out process. The hollow is formed before the thread is cut in. The hollow is located at the same distance from the two end faces of the nut. The thread is cut on both sides of the hollow with the same pitch. Then the nut is subjected to compression in order to achieve an offset of the thread parts on both sides of the hollow with respect to one another.

The Swiss patent 2 49 469 also demonstrates a safety nut which is provided at its unloaded end with a channel by means of part of the thread being removed, with the result that an annular tab is produced which is subjected to upset forging after the main part of the thread. This is another way of providing a securing screw nut.

The German patent 4 90 889 describes a securing action of a nut which is achieved by virtue of the fact that an annular groove with a wedge-shaped cross section is provided in the threaded bore, or in the core of the nut. In this case, too, the continuous thread is interrupted in the upper part of the nut by a cutout, which is designed in such a way that, as a result, a thin wall is produced, so that an upper subsection has a spring effect. Then, the upper subsection is constricted in terms of its diameter by being compressed and at the same time is compressed in terms of its height in order to achieve a cling effect of the nut. The thin wall piece which remains as a result of the cutout in this case produces a spring effect on the constricted and pitch-offset flank diameter of the upper thread part.

These and other known nuts have considerable disadvantages in terms of their operation, but in particular with a view to the complex manufacture which needs to take place in metal-cutting fashion by means of part of the thread or the walls of the nut being removed in order to achieve a sprung securing effect of a thread part.

In the knowledge of these particular facts, the inventor is confronted with the problem of providing a screw nut which can be used efficiently and primarily can be produced simply and quickly.

SUMMARY OF THE INVENTION

According to the invention, an annular collar is integrally formed on one of the end faces of the screw nut and is bent cross-sectionally towards the axis in such a way that, with a section of this end face which surrounds the threaded bore as a bearing face, it delimits an accommodating slot which is directly associated therewith.

In accordance with a further feature of the invention, the cross-sectionally deformed annular collar of the screw nut, which has a polygonal basic outline determined by wall face sections, forms a shaped collar, whose outer face runs at a radial distance from the axially parallel edges of the wall face sections of the screw nut; the accommodating slot is in this case arranged close to the outer face of the shaped collar and said shaped collar is preferably provided with an outer face, which is curved cross-sectionally towards the axis.

Preferably, the accommodating slot, which provides two parallel peripheral edges, is inclined cross-sectionally at an angle with respect to these peripheral edges; however, it is also within the scope of the invention to allow the accommodating slot to run in a diametrical plane of the screw nut.

In a preferred, first variant of the invention, which is explained in particular with reference to FIG. 7 to FIG. 10 in detail within the scope of a first preferred embodiment of the invention, the annular collar is bent cross-sectionally towards the axis in such a way that the accommodating slot is open towards the threaded bore. That is to say that the peripheral edges of the accommodating slot are spaced apart from one another towards the threaded bore.

In a second variant, which is explained in detail in particular with reference to FIG. 11 to FIG. 14 within the context of a further particularly preferred embodiment of the invention, the annular collar is bent cross-sectionally towards the axis in such a way that the accommodating slot is closed towards the threaded bore. That is to say that the peripheral edges of the accommodating slot in practice bear against one another towards the threaded bore.

In both variants, a thread, which is formed in the end region of the bent shaped collar, is offset with respect to the remaining thread of the screw nut, with the result that the securing effect in accordance with the invention is produced when it is screwed onto a bolt or a screw by means of a resilient force acting against the thread flanks of the bolt or the screw. The offset of the thread provided in the end region of the bent shaped collar relative to the remaining thread of the screw nut is comparatively small and is possibly only a few tenths of a millimeter, for example 1 or 2 tenths of a millimeter, which is sufficient for producing the effect in accordance with the invention. Moreover, such an offset, as identified by the invention, can in practice only be achieved by the annular collar bent towards the axis in accordance with the invention.

In order to vary a spring effect of the shaped collar, in particular to design it to be more flexible, it may be advantageous for sections of the annular collar, and correspondingly of the shaped collar, to run along the circumference of the screw nut. In this regard it is advantageous that adjacent sections of the annular collar/shaped collar are completely or partially separated from one another by an interruption, for example a notch or other gap. An individual section may have a more advantageous spring effect intended for a specific use in comparison with a shaped collar running along a full circumference of the screw nut.

The feature that a retaining and/or sealing member is fixed in the accommodating slot, which retaining and/or sealing member protrudes towards the axis beyond the peripheral edges of said accommodating slot and, for example, bears on the inside against a screw pin, which is fixed in the thread of the screw nut, is of particular significance.

The method according to the invention for producing a screw nut proposes that an annular collar with a circular free upper edge is integrally formed on an end face of a blank nut, which corresponds to the basic outline of the screw nut, and is curved cross-sectionally towards the longitudinal axis of the blank nut by a compression tool which is led up to said upper edge axially. In addition, the free upper edge of the annular collar is led up to the adjacent end face of the blank nut in circumferentially parallel fashion and is arranged at a distance therefrom.

According to the invention, in addition, the annular collar is subjected to upset forging in an end region at its upper edge during the deformation, so that this end region has a larger cross section than the adjacent region of the shaped collar.

In accordance with a further feature of the method according to the invention, an internal thread is cut into an axial hole channel of the blank nut or formed into it in another way, in particular also into the end region of the bent shaped collar. In order to complete the screw nut, said shaped collar should moreover be offset towards the internal thread once the internal thread has been formed.

As long as this has not already happened during the bending of the annular collar, this can take place in such a way that the peripheral edges of the accommodating slot are spaced apart from one another or lie one on top of the other towards the threaded bore. The offset brings about a resiliently clamping force on the thread flanks of a bolt or screw when the latter is screwed to the screw nut.

A tool which is suitable for carrying out the method contains, in a housing, a guide channel for a pressure plunger, which ends at an accommodating region, which is formed by an annular rim of a tool end face, for a workpiece; the pressure plunger is mounted in the guide channel in such a way that it is axially displaceable. In addition, this annular rim should have an inner face, which is curved cross-sectionally inwards towards the end face and which influences the way in which the annular collar curves during the pressing operation.

It has proven to be favorable to position a free pressure front end of the pressure plunger onto the workpiece within the annular collar thereof, with the housing being arranged on it in such a way that it can be supplied to the annular collar of the workpiece.

In accordance with a further feature of the invention, that end of the pressure plunger which is remote from the free pressure front end is provided with at least one radially protruding stop member; an inner step of the housing is arranged as the opposing stop in the movement path of said stop member.

Overall, an impressive solution is provided for achieving the object envisaged by the inventor.

BRIEF DESCRIPTION OF THE DRAWINGS

Further advantages, features and details of the invention are given in the description below of preferred exemplary embodiments and in the drawings, in which:

FIG. 1 shows a side view of a partially sectioned pressure-generating tool with a likewise partially sectioned workpiece which is associated with it in its longitudinal axis (at a distance);

FIG. 2 shows the plan view of the workpiece in FIG. 1;

FIG. 3 shows an angled view of the workpiece reproduced in enlarged form in comparison with FIG. 1 and FIG. 2;

FIG. 4 shows the partially sectioned side view of the tool with the workpiece partially accommodated;

FIG. 5 shows an enlarged detail of the longitudinally sectioned tool with the workpiece deformed;

FIG. 6 shows an enlarged detail from FIG. 5 as denoted by the arrow VI therein;

FIG. 7 shows an illustration of the deformed workpiece of the screw nut, which illustration corresponds to that in FIG. 3;

FIG. 8 shows the workpiece once it has been machined and the screw nut in a partially sectioned illustration;

FIG. 9 shows the plan view of the machined workpiece and the screw nut from FIG. 8;

FIG. 10 shows a partial reproduction, which is enlarged in comparison with FIG. 8, of the machined workpiece and the screw nut;

FIG. 11 shows an illustration of the deformed workpiece of the screw nut, which illustration corresponds to that in FIG. 3, in accordance with a developed embodiment;

FIG. 12 shows the workpiece once it has been machined and the screw nut, in accordance with the developed embodiment shown in FIG. 11, in a partially sectioned illustration;

FIG. 13 shows the plan view of the machined workpiece and the screw nut, in accordance with the developed embodiment shown in FIG. 11;

FIG. 14 shows a partial reproduction, which is enlarged in comparison with FIG. 12, of the workpiece and the screw nut, in accordance with the developed embodiment shown in FIG. 11;

FIG. 15 shows an angled view of a developed embodiment of a workpiece which has been reproduced on an enlarged scale in comparison with FIG. 1 and FIG. 2.

DETAILED DESCRIPTION

A metallic tool 10 for machining an annular workpiece 50 has a pressure plunger 12 with a length a of in this case 76 mm and a diameter d of approximately 10 mm, with a central stop plate 14 with a diameter $d_1$ of in this case 12 mm and an axial thickness b of 3 mm being shaped out of the upper (in FIG. 1) end of said pressure plunger. The length of this diameter d of the pressure plunger 12, and therefore of its pressure front end 15, is dependent on the diameter of a hole channel (described further below) of a blank nut 52. The pressure plunger 12 is mounted displaceably in a guide channel 16 of a sleeve-like housing 20, whose axial length h is in this case given as 78 mm, given an outer diameter c of approximately 22 mm. The diameter e of the guide channel 16, which runs in the housing longitudinal axis A, is slightly larger than the diameter d of this pressure plunger 12.

An annular collar 24 is integrally formed on the outer face 22 of the cylindrical housing 20 at the axial distance n of 23 mm from the upper opening rim 32 of said cylindrical housing. Firstly, a socket-like section 28 of the housing 20 ends at a diametrical plane D determined by the upper (in FIG. 1) annular edge 26 of said annular collar, which socket-like section contains the guide channel 16 and merges at this plane D with a top section 30 of the housing 20, which top section provides the mentioned opening rim 32. Secondly, the guide channel 16 opens out into an axial channel 18 so as to form an annular inner step 17 as the opposing stop member for the stop plate 14, which axial channel 18 acts as an extension of said guide channel, with the length of said axial channel being determined by this axial distance n of the annular collar 24 from the opening rim 32 and with the axial channel 18 running in the top section 30 of the housing 20. The wall thickness z of 3 mm of the top section 30 is smaller than the wall thickness $z_1$ of approximately 5 mm of the socket-like section 28. Moreover, the annular collar 24 has an inclined annular face 25 with respect to the socket-like section 28 in the region of said annular collar which is close to said socket-like section.

The free end of the socket-like section 28 of the housing 20 is determined by an annular rim 34 with a height i of approximately 4 mm, an inner face 38, which is inclined at an angle w of approximately 25° towards the longitudinal axis A, emerging from the annular edge 36 of said annular rim 34. This inner face 38 ends at an end face 40, which is inclined cross-sectionally with respect to the longitudinal axis A, of the housing socket-like section 28.

In FIG. 1, a workpiece 50 comprising a metal material is associated axially with the housing 20 or the annular rim 34 thereof. The workpiece in question here is the blank of a blank nut 52 with a hexagonal basic outline with an axial height q (determined by two end faces 54, $54_r$ of the blank nut 52) of approximately 10 mm. A hole channel 58 extends in the workpiece longitudinal axis E between six wall face sections 56 of the blank nut 52 which intrinsically have straight faces. An annular collar 64 with a height $q_1$ of, for example, 5 mm and a small wall thickness t is integrally formed, axially parallel, on the upper end face 54 (shown in FIG. 3) so as to delimit an inner annular bearing face 55, the free upper edge 66 of said annular collar 64 having a circular basic outline.

The pressure plunger 12 of the tool 10 is supplied coaxially to the workpiece 50 which rests on a basic area indicated by Q in such a way that the pressure front end 15 of said pressure plunger 12 matches this bearing face 55, i.e. its inner diameter $t_1$ is slightly longer than the diameter d of the pressure front end 15. When the housing 20 is lowered in the pressure direction P, the inclined inner faces 38 of the annular edge 36 thereof and the adjacent end face 40 deform the annular collar 64 of the workpiece 50 as shown in FIGS. 5, 6 in the course of the cold extrusion process to form a shaped collar 74, which is curved cross-sectionally towards the axis, with an internal thread 60 being shaped, for example cut, once this shaped collar has been produced in the hole channel 58; a fastening screw nut 70 sketched in FIGS. 7 to 10 with a screw socket 72 with the height y, which screw socket provides these axially parallel wall face sections 56, is thus produced; this hole channel 58 is formed into a screw hole or a threaded bore 62 by means of the internal thread being formed in it. Said screw hole or threaded bore is axially opposite the shaped collar 74 with the upper or outer face 76, which is curved cross-sectionally towards the axis. This shaped collar is produced when this annular collar 64 is compressed as a result of the cross-sectional deformation thereof and contains a circumferential inner groove as the accommodating slot 78 for an insert ring (not illustrated). Once the internal thread 60 has been formed, the housing 20 or a corresponding tool is pressed onto the annular collar 64 and the latter is deformed slightly towards the internal thread 60.

The cross section of the accommodating slot 78, which runs close to the outer face 76 of the shaped collar 74, is inclined in FIG. 10 towards its peripheral edges 80 at a flat angle k, but in a different configuration can also run in a diametrical plane of the shaped collar 74, i.e. without any cross-sectional incline. FIG. 6 illustrates the end region 81 of the inclined shaped collar 74, which is subjected to upset forging during the shaping process, as a result of which an upset-forging bead 84 is formed at the free end, which upset-forging bead is cross-sectionally wider than the shaped collar 74 per se; these cross-sectional differences are not reproduced in FIG. 10 for reasons of clarity.

FIG. 10 shows an outer protrusion 82 of the radial width r between the axially parallel wall face section 56 and the outer face 76 of the shaped collar 74, which outer protrusion 82 is the section of the mentioned upper end face 54; the radial width r shown of the outer protrusion 82 only exists at the axially parallel edges 57 of the wall face sections 56.

The above-mentioned insert ring, which is held in clamping fashion in the form of a ring element in the accommodating slot 78 and protrudes towards the axis beyond the peripheral edges 80 and bears, as a retaining and/or sealing member, against a screw pin or the like arranged in a screw hole 62, is not illustrated. This insert ring is produced from a rigid material or a material which is flexible to a limited extent, depending on the function.

In the embodiment shown in FIG. 3 of a blank nut 52, the annular collar 64 does not have a thread on its inner side facing towards the hole channel 58. In those embodiments of a ready-machined screw nut FIG. 7 to FIG. 10, on the one hand, and FIG. 11 to FIG. 14, on the other hand, which differ from this latter embodiment, the annular collar has a thread on its inner side facing towards the threaded bore 62, i.e. in the end region 81.

The thread in the end region 81 is offset with respect to the remaining internal thread 60 with a slight offset, in this case 1 to 2 tenths of a millimeter. When the screw nut is screwed on, for example the screw nut from FIG. 10 or the screw nut from FIG. 14, the shaped collar 74 is therefore "bent up" in the opposite direction to the arrow direction denoted by S and, once the correct degree of thread pitch has been reached, snaps into the thread flanks of a bolt or screw thread, but while maintaining a certain stress which is achieved by the offset of the thread which is fitted in the end region 81 of the annular collar 64 which is bent towards the axis and brings about a corresponding spring force acting in the arrow direction denoted by S. A screw connection formed between the screw nut and a bolt or a screw is thereby secured against opening. In an embodiment which is developed in comparison with FIG. 7 to FIG. 10, FIG. 11 to FIG. 14 show a screw nut, in the case of which screw nut, which is otherwise as illustrated in the preceding FIG. 1 to FIG. 10, in developed form the annular collar 64 is bent cross-sectionally towards the axis in such a way that the accommodating slot 78 is closed towards the threaded bore 62. In this case, the peripheral edges 80 of the accommodating slot 78 bear against one another towards the threaded bore 62. In other words, the accommodating slot 78 has a cross-sectional drop-shaped edging shown in FIG. 14, with the result that the peripheral edges 80 running on the accommodating slot 78 are now inclined with respect to one another in accordance with the angle k', in the development of the angle k in FIG. 10. The peripheral edges 80 of the accommodating slot 78 can bear against one another completely towards the threaded bore 62 as a result of the shaped collar 74 towards the inner thread 60 once, as explained, the internal thread 60 has been formed both in the end region 81 and in the remaining screw nut. The subsequent offsetting of the shaped collar 74 is in this case achieved by final bending-in or upset-forging (to a slight extent corresponding to the offset) of the shaped collar 74. In principle, in the embodiment illustrated in FIG. 10, an offset can be designed to be more pronounced, while in the embodiment illustrated in FIG. 14, a securing, resilient force can be achieved as a result of the increased bending of the shaped collar 74. The offset can be in the region of 1 to 2 thread pitches. In the example in FIG. 10, the offset is 1.5 thread pitches. In the example in FIG. 14, the offset is 1 thread pitch. In the two embodiments, it has proven to be particularly advantageous that the end region 81, which is adjacent to the accommodating slot, of the shaped collar 74 is thicker than the adjacent cross section thereof, which, as shown in FIG. 6, is comparatively thin and can therefore be bent back easily and simplifies the processing and production of the screw.

FIG. 15 shows an embodiment of a workpiece 50' which has been developed in comparison with that in FIG. 3, and this workpiece 50', in the same way as the workpiece 50 shown in FIG. 3, can be used as the basis for a screw nut as shown in FIG. 5 to FIG. 14. In the case of the workpiece 50', only sections of the annular collar run along the circumference of the workpiece 50'. In this case, three sections 64' are provided which are completely separated from one another by three interruptions in the form of gaps 65 and are integrally formed on the end face 54 of the workpiece 50'.

The sections 64' can be bent towards the axis, as described above (FIG. 5, FIG. 6) in order to obtain a screw nut in accordance with the concept of the invention.

The spring action of a shaped collar formed from the sections 64' is comparatively smoother and more flexible than that of a shaped collar running along the full circumference as shown in FIG. 7 to FIG. 14.

The invention claimed is:

1. A screw nut comprising a metallic material with a threaded bore and an inner groove which is associated with the longitudinal axis of said threaded bore in radially circumferential fashion, wherein an annular collar is integrally formed on one of the end faces of the screw nut and is bent cross-sectionally towards the axis in such a way that, with a section of this end face which surrounds the threaded bore as a bearing face, it delimits an accommodating slot which is directly associated therewith, the cross-sectionally deformed annular collar forms a shaped collar, whose outer face runs at a radial distance from the axially parallel edges of the wall face sections of the screw nut, the accommodating slot being arranged close to the outer face of the shaped collar, the accommodating slot, which provides two parallel peripheral edges, is inclined cross-sectionally at an angle with respect to the peripheral edges, and wherein the annular collar is bent cross-sectionally towards the longitudinal axis in such a way that the accommodating slot is closed towards the threaded bore and the peripheral edges of the accommodating slot bear against one another towards the threaded bore.

2. A screw nut comprising a metallic material with a threaded bore and an inner groove which is associated with the longitudinal axis of said threaded bore in radially circumferential fashion, wherein an annular collar is integrally formed on one of the end faces of the screw nut and is bent cross-sectionally towards the axis in such a way that, with a section of this end face which surrounds the threaded bore as a bearing face, it delimits an accommodating slot which is directly associated therewith, wherein the annular collar is bent cross-sectionally towards the longitudinal axis in such a way that the accommodating slot is closed towards the threaded bore and peripheral edges of the accommodating slot bear against one another towards the threaded bore.

3. A screw nut made of a metal material comprising end faces (54), a threaded bore (62) and an inner groove (78) which is associated with a longitudinal axis (E) of said threaded bore in a radially circumferential manner, an annular collar (64) being integrally formed on a first end face (54) of the screw nut (70) and being bent in cross-section towards the longitudinal axis (E) in such a way as to delimit, together with a portion of the first end face surrounding the threaded bore (62) as a bearing face (55), an accommodating slot (78) associated with first end face, wherein the annular collar (64) which is deformed in cross-section forms a shaped collar (74), and an end region (81), which is adjacent to the accommodating slot (78), of the shaped collar (74) comprises an upset ridge (84) which has a cross-section wider than the adjacent cross-section of the shaped collar (74), the end region (81) having a thread which is offset from the remainder of an internal thread (60) of the threaded bore (62).

4. The screw nut according to claim 3, comprising a polygonal basic outline determined by wall face portions (56), wherein the outer face (76) of the shaped collar (74) extends at a radial distance (r) from axially parallel edges (57) of the wall face portions (56) of the screw nut (70), the accommodating slot (78) being arranged close to the outer face of the shaped collar.

5. The screw nut according to claim 4, including an outer face (76), which is curved in cross-section towards the axis, of the shaped collar (74).

6. The screw nut according to claim 4, including an inner face, which is curved downwards in cross-section, of the shaped collar (74).

7. The screw nut according to claim 3, wherein the accommodating slot (78), which provides two parallel peripheral edges (80), is inclined in cross-section at an angle (K') to the peripheral edges.

8. The screw nut according to claim 7, wherein the annular collar (64) is bent in cross-section towards the longitudinal axis (E) in such a way that the accommodating slot (78) is open towards the threaded bore (62) and the peripheral edges (80) of the accommodating slot (78) are spaced apart from one another towards the threaded bore (62).

9. The screw nut according to claim 7, wherein the annular collar (64) is bent in cross-section towards the longitudinal axis (E) in such a way that the accommodating slot (78) is closed towards the threaded bore (62) and the peripheral edges (80) of the accommodating slot (78) are adjacent to one another towards the threaded bore (62).

10. The screw nut according to claim 3, wherein the annular collar (64) extends on an outer wall of a first face (54).

11. The screw nut according to claim 3, wherein the annular collar (64) extends along a full circumference of the screw nut.

12. The screw nut according to claim 3, wherein the annular collar extends along portions of a circumference of the screw nut.

13. The screw nut according to claim 12, wherein adjacent portions (64') of the annular collar are separated from one another by an interruption (65).

14. The screw nut according to claim 7, wherein a sealing member is fixed in the accommodating slot (78) and protrudes over the peripheral edges (80) of said accommodating slot towards the longitudinal axis (E).

15. The screw nut according to claim 14, wherein the sealing member is annular.

* * * * *